US010571154B2

(12) United States Patent
Kuckelkorn (10) Patent No.: US 10,571,154 B2
(45) Date of Patent: Feb. 25, 2020

(54) METHOD FOR DISCHARGING A HYDROGEN STORAGE SYSTEM IN PARABOLIC TROUGH RECEIVERS

(71) Applicant: SCHOTT AG, Mainz (DE)

(72) Inventor: Thomas Kuckelkorn, Jena (DE)

(73) Assignee: SCHOTT AG, Mainz (DE)

( * ) Notice: Subject to any disclaimer, the term of this patent is extended or adjusted under 35 U.S.C. 154(b) by 201 days.

(21) Appl. No.: 15/422,330

(22) Filed: Feb. 1, 2017

(65) Prior Publication Data
US 2017/0219250 A1    Aug. 3, 2017

(30) Foreign Application Priority Data

Feb. 3, 2016 (DE) .................. 10 2016 201 652

(51) Int. Cl.
*F24S 80/20* (2018.01)
*F24S 40/46* (2018.01)
*F24S 10/40* (2018.01)

(52) U.S. Cl.
CPC .............. *F24S 40/46* (2018.05); *F24S 10/45* (2018.05); *F24S 80/20* (2018.05)

(58) Field of Classification Search
CPC .. F24S 40/46; F24S 20/20; F24S 10/45; F24S 80/20; Y02E 10/41; Y02E 10/44
See application file for complete search history.

(56) References Cited

U.S. PATENT DOCUMENTS

| 4,455,998 | A | * | 6/1984 | Kroontje | ................ | G05D 23/01 |
| | | | | | | 126/635 |
| 4,708,124 | A | * | 11/1987 | Dorbeck | .................. | F24S 80/10 |
| | | | | | | 126/654 |
| 4,886,048 | A | * | 12/1989 | Labaton | ..................... | F04F 9/00 |
| | | | | | | 165/104.27 |
| 5,041,715 | A | | 8/1991 | Müller | | |
| 5,192,846 | A | * | 3/1993 | Duthoo | ................ | B23K 26/032 |
| | | | | | | 219/121.63 |
| 9,939,176 | B2 | * | 4/2018 | Kuckelkorn | ............ | F24S 23/74 |

(Continued)

FOREIGN PATENT DOCUMENTS

| CN | 101289164 | 10/2008 |
| CN | 101893340 | 11/2010 |

(Continued)

*Primary Examiner* — Sarang Afzali
*Assistant Examiner* — Ruth G Hidalgo-Hernandez
(74) *Attorney, Agent, or Firm* — Ohlandt, Greeley, Ruggiero & Perle, L.L.P.

(57) ABSTRACT

The present disclosure describes a method for discharging a hydrogen storage system that is found in the annular space of a receiver tube, in particular for solar collectors, wherein the annular space is formed at least by an outer-lying tubular jacket and an inner-lying absorber tube of the receiver tube, and the outer-lying tubular jacket is joined by means of a wall to the absorber tube. The method is hereby characterized in that a first opening penetrating the tubular jacket or the wall is produced under a protective gas atmosphere, wherein protective gas enters through the first opening into the annular space, after which a process chamber with a connection for a vacuum pump is arranged in a gas-tight manner above the first opening, the receiver tube is evacuated through the first opening, and the first opening is subsequently sealed in a gas-tight manner.

20 Claims, 7 Drawing Sheets

(56) References Cited

U.S. PATENT DOCUMENTS

| | | |
|---|---|---|
| 2004/0050381 A1 | 3/2004 | Kuckelkorn |
| 2007/0034204 A1 | 2/2007 | Kuckelkorn et al. |
| 2007/0235024 A1 | 10/2007 | Kuckelkorn et al. |
| 2012/0017887 A1 | 1/2012 | Ahnert et al. |
| 2012/0211003 A1 | 8/2012 | Kuckelkorn |
| 2014/0345600 A1 | 11/2014 | Mollenhoff |
| 2017/0108244 A1 | 4/2017 | Matsudo |
| 2017/0184325 A1 | 6/2017 | Kuckelkorn |

FOREIGN PATENT DOCUMENTS

| | | |
|---|---|---|
| CN | 202008244 | 10/2011 |
| CN | 202747665 | 2/2013 |
| CN | 203687399 | 7/2014 |
| CN | 106687246 | 5/2017 |
| DE | 19821137 A1 | 11/1999 |
| DE | 102005022183 | 8/2006 |
| DE | 102005057276 | 7/2007 |
| DE | 102009017741 | 7/2010 |
| DE | 102011082772 | 4/2013 |
| ES | 2375006 | 2/2012 |
| ES | 2487441 | 8/2014 |
| JP | S57128053 | 8/1982 |
| WO | 2004063640 | 7/2004 |
| WO | 2014126472 | 8/2014 |
| WO | 2015151774 | 10/2015 |

* cited by examiner

Step 1   Producing a first opening under protective gas atmosphere
Step 2   Arranging a process chamber above the first opening
Step 3   Evacuating the annular space through the first opening
Step 4   Sealing the first opening

Fig. 1

| Schritt 1 | Erzeugen einer ersten Öffnung unter Schutzgasatmosphäre |
|---|---|
| Schritt 2 | Anordnen einer Prozesskammer über der ersten Öffnung |
| Schritt 3 | Evakuieren des Ringraumes durch erste Öffnung |
| Schritt 3a | Befüllen des Ringraumes mit Schutzgas durch erste Öffnung |
| Schritt 3b | Entfernen der Prozesskammer |
| Schritt 4 | Verschließen der ersten Öffnung |

| Schritt 5 | Aufbringen der Prozesskammer |
|---|---|
| Schritt 6 | Evakuieren der Prozesskammer |
| Schritt 7 | Erzeugen einer zweiten Öffnung |
| Schritt 8 | Evakuieren des Ringraumes durch zweite Öffnung |
| Schritt 9 | Verschließen der zweiten Öffnung |

| Step 1 | Producing a first opening under protective gas atmosphere |
|---|---|
| Step 2 | Arranging a process chamber above the first opening |
| Step 3 | Evacuating the annular space through the first opening |
| Step 3a | Filling the annular space with protective gas through the first opening |
| Step 3b | Removing the process chamber |
| Step 4 | Sealing the first opening |
| Step 5 | Introducing the process chamber |
| Step 6 | Evacuating the process chamber |
| Step 7 | Producing a second opening |
| Step 8 | Evacuating the annular space through the second opening |
| Step 9 | Sealing the second opening |

METHOD FOR DISCHARGING A HYDROGEN STORAGE SYSTEM IN PARABOLIC TROUGH RECEIVERS

CROSS-REFERENCE TO RELATED APPLICATIONS

The present application claims the benefit of German Patent Application 10 2016 201 652.0, filed on Feb. 3, 2016, which is herein incorporated by reference.

BACKGROUND OF THE DISCLOSURE

1. Field of the Disclosure

The present disclosure relates to a method for discharging a hydrogen storage system, which is present in the annular space of a receiver tube, wherein the annular space is formed between an outer-lying tubular jacket and an inner-lying absorber tube of the receiver tube, and the outer-lying tubular jacket is joined to the absorber tube via a wall in a gas-tight manner. The wall is generally composed of metal and includes a glass-metal transition element and an expansion compensating element as well as other connection elements. Furthermore, the disclosure relates to a device for discharging a hydrogen storage system that is present in the annular space of the receiver tube.

2. Discussion of Related Art

Solar collectors comprise a collector mirror—for example, a parabolic cylindrical mirror (parabolic trough)—and a receiver tube, and are utilized in solar thermal power plants preferably for the generation of electricity. The receiver tube is arranged in the focal line of each collector mirror and is generally composed of an absorber tube made of steel, which has a radiation-absorbing layer, and a tubular jacket made of glass, which surrounds the absorber tube and thermally insulates it. In the known solar thermal power plants, a thermal oil, which is utilized as a heat transfer medium, is carried through the absorber tube and can be heated to a temperature of about 400° C. by means of the solar radiation reflected from the collector mirrors and focused on the absorber tube. The energy stored in the heat transfer medium is released via a heat exchanger into a steam circuit and converted to electrical energy in a turbine.

An annular space is formed in the receiver tube between the absorber tube and the tubular jacket. This annular space serves to minimize heat losses at the outer surface of the absorber tube and thereby to increase the efficiency of the solar collector. For this purpose, the annular space is evacuated, so that heat can be emitted from the absorber tube to the greatest extent possible only in the form of radiation.

The thermal oil utilized as the heat transfer medium in the absorber tube exhibits a temperature-dependent aging and a decomposition rate associated therewith. The decomposition of the heat transfer medium in the long run leads to the formation of various decomposition products, which include, among others, hydrogen. The amount released during the aging process depends, on the one hand, on the thermal oil used and the operating conditions in the solar thermal power plants and, on the other hand, on the degree of purity of the heat transfer medium.

By way of permeation, the hydrogen released by decomposition of the heat transfer medium partially enters the evacuated annular space of the receiver. Because the hydrogen permeability of glass is less than that of steel by orders of magnitude, the hydrogen accumulates in the annular space. In consequence, the pressure in the annular space rises and the thermal conductivity of the annular space increases as well. This occurs until an equilibrium prevails between the partial pressures of hydrogen in the absorber tube and in the annular space. It is especially a drawback in this case that hydrogen has a higher thermal conductivity than air, for example, so that, as hydrogen permeation progresses further, the thermal conductivity in the annular space is even better than that of the air outside the receiver tube. In consequence, the efficiency of the receiver tube drops and hence so does that of the complete solar collector.

In order to counteract this increase in the partial pressure of hydrogen in the annular space and thereby maintain the high efficiency of the receiver tube, various solutions are known from the prior art.

Known from DE 10 2009 017 741 A1, for example, is a receiver tube, which comprises a valve arrangement that extends through the wall of the tubular jacket into the annular space. This valve arrangement makes it possible to flush the annular space or to evacuate it whenever a large proportion of interfering substances, such as hydrogen, for example, has accumulated.

In addition, the hydrogen that has diffused into the annular space can be bound by means of a getter. However, the absorption capacity of such materials is limited, so that, once a material-specific maximum absorption capacity has been attained, no further hydrogen can be bound and the pressure in the annular space increases once again.

Receiver tubes with a getter material arranged in the annular space are known from WO 2004/063640 A1, for example. In the device described in this specification, the getter material is arranged in getter bridges between the absorber tube and the tubular jacket directly in the annular space. The getter bridge produces a spacing between the absorber tube and the getter, so that the thermal load on the getter is reduced and its absorption capacity is thereby improved. However, apart from the use of a getter material, no other solution for diminishing the hydrogen concentration in the annular space has been provided, so that the drawbacks of the getter described above still remain.

In order to alleviate the problem of getter materials, DE 198 21 137 A1 discloses a receiver tube for solar thermal applications, in which, in addition, noble gas with a partial pressure of up to several hundred mbars is present in the annular space. The advantage of this solution is that many noble gases have a lower thermal conductivity than air, so that the thermal conduction through the annular space and the deterioration in efficiency associated therewith can be reduced. However, the drawback of this design is that the annular space is filled with noble gas from the very start, so that, already directly after installation of the solar collector, a lower efficiency is achieved than for the case of an evacuated annular space.

Alternative embodiments, such as, for example, those disclosed in DE 10 2005 057 276 B3, provide for at least one gas-tight sealed tank, filled with at least one noble gas, in the annular space, from which the noble gas is admitted to the annular space once the getter material is exhausted. The drawback of this alternative embodiment is that the solar collector and, in particular, the receiver tube must be fabricated already with a filled tank. Retrofitting is not possible, so that the customer needs to make a decision directly during fabrication of the receiver tube about bearing the extra costs and the increased work effort involved. Another difficulty is presented in opening the tank, which can occur only with increased effort.

A method for opening the tank and for filling the annular space with noble gas is known from DE 10 2011 082 772 B9, wherein the tank is opened by means of a laser drilling method. A laser beam is directed from the outside through the tubular jacket onto the tank, which is irradiated until an opening forms in the tank and the protective gas is released. However, a drawback of this disclosure is also that retrofitting of the receiver tube with the protective gas tank is not possible and the customer needs to bear the increased costs and fabrication effort already during the fabrication, even though the noble gas is employed only a long time after startup.

Thus, at present, no method is known for making it possible to restore in a satisfactory manner the efficiency of a receiver tube that has already suffered losses in performance due to elevated hydrogen pressure in the annular space.

Therefore, the object of the disclosure is to provide a method that achieves an improvement in the efficiency of the receiver tube in the most effective and cost-effective way possible.

SUMMARY OF THE DISCLOSURE

These and other objects are achieved with a method that, in one embodiment, provides for discharging a hydrogen storage system, which is found in the annular space of a receiver tube, wherein the annular space is formed at least by an outer-lying tubular jacket and an inner-lying absorber tube of the receiver tube, and the outer-lying tubular jacket is joined by means of a wall to the absorber tube, is hereby characterized in that an opening penetrating through the tubular jacket or the wall is produced under protective gas atmosphere, whereby protective gas penetrates into the annular space through the first opening, after which a process chamber with a connection for a vacuum pump is arranged in a gas-tight manner above the first opening, the receiver tube is evacuated through the first opening and the first opening is subsequently sealed in a gas-tight manner Features, advantages, and exemplary embodiments of the method for discharging a hydrogen storage system will be explained in the following description and Figures.

DETAILED DESCRIPTION OF THE DISCLOSURE

The method named initially for discharging a hydrogen storage system will be explained on the basis of FIG. 1 and according to the disclosure provides that in a first process step (step 1), a first opening that penetrates the tubular jacket or the wall is produced under a protective gas atmosphere, wherein the protective gas penetrates through the first opening into the annular space; in a second step (step 2), a process chamber with a connection for a vacuum pump is arranged in a gas-tight manner above the first opening; in a third process step (step 3), the receiver tube is evacuated through the first opening; and in the fourth process step (step 4), the opening is sealed in a gas-tight manner.

As is known from the prior art, hydrogen can be found both in the annular space itself as well as bound by sorption by a getter arranged in the annular space. Consequently, the hydrogen storage system here and in the following comprises both the volume of the annular space itself as well as a getter found in the annular space. The total capacity of the hydrogen storage system comprises the absorption capacity of the annular space as well as the absorption capacity of the getter. During the entire method, the getter arranged in the annular space must not come into contact with air, since the latter would react with the oxygen in air. The absorption capacity of the getter for hydrogen would be reduced thereby. The production of the first opening under a protective gas atmosphere prevents the penetration of air into the annular space and thus a reduction in the absorption capacity of the getter. A protective gas atmosphere can be generated, for example, by means of a gas tank, which is disposed in a gas-tight manner at the tubular jacket or the wall of the receiver tube, and which at least partially surrounds the means for producing the first opening. Protective gas can be introduced into the gas tank via a gas inlet opening in the gas tank and thus the getter in the annular space can be protected from contact with air when the first opening is produced.

The arrangement of a process chamber with connection for a vacuum pump above the first opening permits the evacuation of the annular space. In this case, the free hydrogen found in the annular space and the protective gas entering into the annular space during the production of the first opening are pumped out.

Another advantage of the method according to the disclosure consists of the fact that the annular space of a receiver tube that is already operational subsequently can be again returned to a fully functional state almost without loss of efficiency and without great expense of time and cost after reaching the loading limit of the getter. The receiver tube can be used from the beginning without protective gas or protective gas tank, so that a maximum efficiency can be realized even at the beginning of application. For example, even in cases in which, due to an irregular operating mode that has led to elevated operating temperature or to contamination of the heat transfer medium, for example, the negative influences of an increased hydrogen permeation can be efficiently reduced.

A critical value of possible power losses of a receiver tube can be derived, for example, from the hydrogen concentration that is actually present in the annular space and that will be measured by suitable sensors. Also, a temperature measured at the glass tubular jacket is a suitable indicator, since with increasing hydrogen concentration, the heat conductivity of the annular space and thus also the temperature of the glass tubular jacket increase during operation. However, even before an increase in the temperature of the glass tubular jacket can be detected during operation but already leads to increased heat losses, it can be determined via the determination of the loading state of the getter whether an discharging is necessary in the sense of preventive maintenance. For this purpose, the getter can be heated to different temperature steps with a heater introduced from outside onto the receiver tube and the corresponding temperature of the tubular jacket can be measured. The loading state of the getter material can be determined from the heat conduction determined in this way. Power losses can be prevented in this way.

Figure 1:
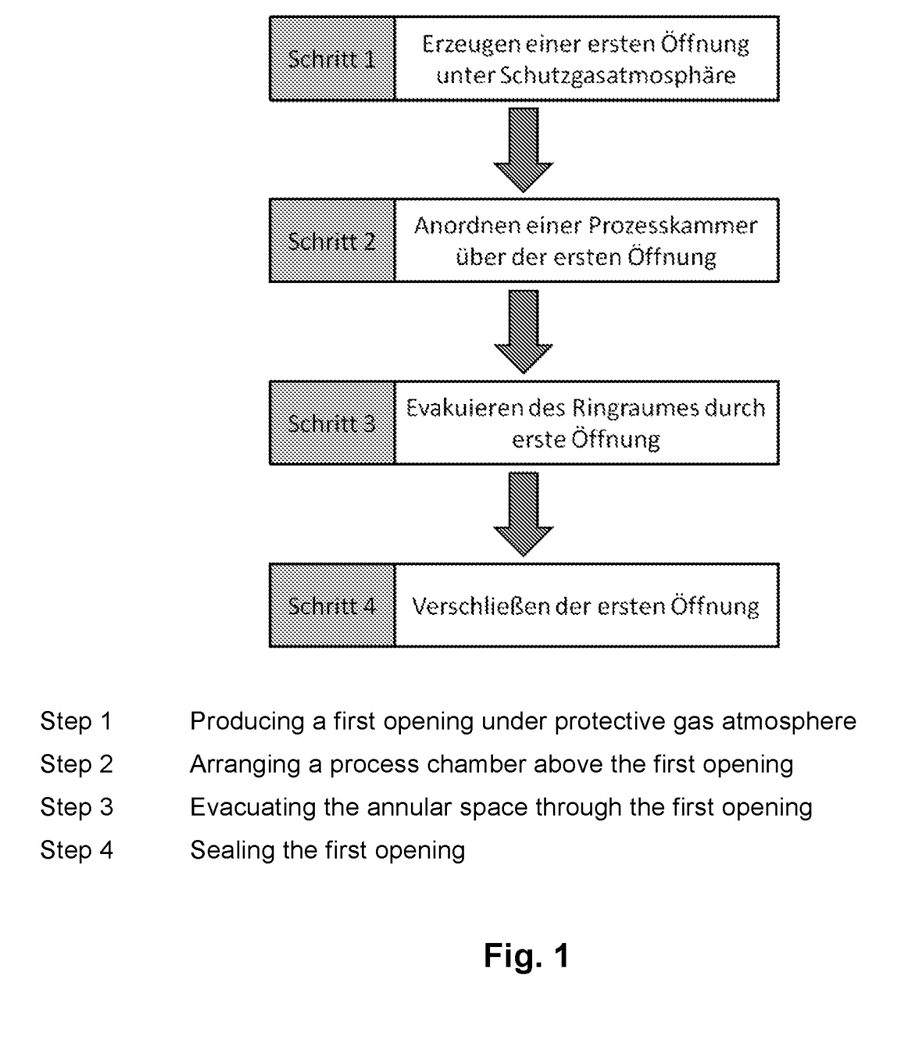
FIG. 1 shows a flow chart with the process steps of a first embodiment of the method according to the disclosure.

The method according to the disclosure with the process steps shown in FIG. 1 is advantageously enhanced by the features presented in the following.

In an advantageous embodiment of the method according to the disclosure, the first opening is produced mechanically.

The speed of evacuating an annular space through an opening in the walls or the tubular jacket of the receiver tube depends on the dimensions of the opening. In comparison to small openings and with the same pressure ratios, large openings make possible a more rapid emptying of the annular space. The advantage of the mechanical production of the first opening lies primarily in the fact that larger dimensions of the opening can be achieved with less technical expenditure than, for example, when the opening is produced with a laser drilling method.

In an advantageous enhancement of the method according to the disclosure, after the evacuation, the annular space is filled with protective gas via the first opening and prior to sealing the first opening. Step 3a; see FIG. 2.

This permits removing the process chamber for sealing the first opening and introducing an additional closure material onto the first opening, without risking a contamination of the annular space with air.

Advantageously, the evacuation through the first opening and the filling of the annular space prior to sealing the first opening are repeated cyclically.

In the cyclical evacuation and filling of the annular space, the protective gas acts as a flushing gas and the last residues of hydrogen that remain are also flushed out of the annular space due to the ongoing gas movement.

In another advantageous embodiment of the method according to the disclosure, when the first opening is produced and/or when the annular space is filled after the evacuation through the first opening, the protective gas atmosphere has a pressure $P_{SG}$, which assumes a value in the range of $P_U \leq P_{SG} \leq P_U + 0.1$ bar, wherein $P_U$ is the ambient pressure outside the receiver tube.

Advantageously, protective gas is introduced into the annular space at least during the production of the first opening and/or in the filling of the annular space through the first opening, until pressure equilibrium is reached between annular space and protective gas atmosphere.

In an advantageous enhancement of the method according to the disclosure, the protective gas is nitrogen, argon, or a mixture of nitrogen and argon.

As already described, a getter disposed in the annular space must not come into contact with air, since if it did, its absorption capacity for hydrogen would be reduced. The slight overpressure that is produced in the annular space as described above can prevent the penetration of ambient air into the annular space prior to each of steps 2 and 4 in FIG. 2.

As mentioned in the preceding description, the hydrogen storage system contains getter material for uptake and storage of hydrogen in order to increase the absorption capacity for hydrogen. The absorption capacity of the getter decreases with increasing temperature. An advantageous embodiment of the method according to the disclosure aims at utilizing this effect, whereby the hydrogen storage system is thermally discharged.

By an induced temperature increase of the hydrogen storage system, hydrogen is released from the getter and the hydrogen partial pressure increases in the annular space. This process is designated thermal discharging. Simultaneously, the heat conductivity of the annular space increases due to the free hydrogen, which accelerates the heating and thus the entire process. The hydrogen that is released is removed from the annular space through the first opening during evacuation. Consequently, with the help of the thermal discharging of the hydrogen storage system, the hydrogen can be discharged from the annular space in a shorter time than without thermal discharging.

Advantageously, the receiver tube is heated prior to the evacuation through the first opening and/or during the evacuation through the first opening.

The heating process can be started before, during or after the opening. The heating process increases the temperature of the hydrogen storage system and reduces its capacity. Consequently, it gives off hydrogen. The hydrogen storage system in this case can be heated indirectly, for example, via the wall of the receiver tube and/or the tubular jacket by introducing annularly or linearly arranged heating elements, and/or can be heated inductively. For getters that are mounted on the metal wall of the receiver tube, a contact heating unit is preferably introduced at an outer side of the metal wall lying opposite the annular space. For hydrogen storage systems that are mounted on the absorber tube with a bridge in the annular space, a radiant heating unit or an induction heating unit is preferably positioned above the bridge.

In another advantageous embodiment, the hydrogen entering into the process chamber through the first opening is carried away by a mechanical and/or chemical pumping system. In this case, the combination of a mechanical pumping system and an external getter, which is found in a tank coupled in a gas-tight manner to the process chamber, is particularly advantageous.

This has the advantage that a loading process of the external getter material occurs outside the annular space simultaneously with the discharging process of the annular space. The external getter material is part of the pumping device for pumping out the hydrogen from the annular space and can be used instead of, but preferably complementary to a mechanical pump.

Advantageously, the external getter material is again discharged after terminating the evacuation through the first opening.

By discharging the external getter, the latter is returned to its initial state and its absorption capacity for hydrogen is again increased. In this way, the same external getter material can be used again for discharging hydrogen storage systems of a plurality of receiver tubes. Cost and material expenditure can thus be reduced.

Figure 2:
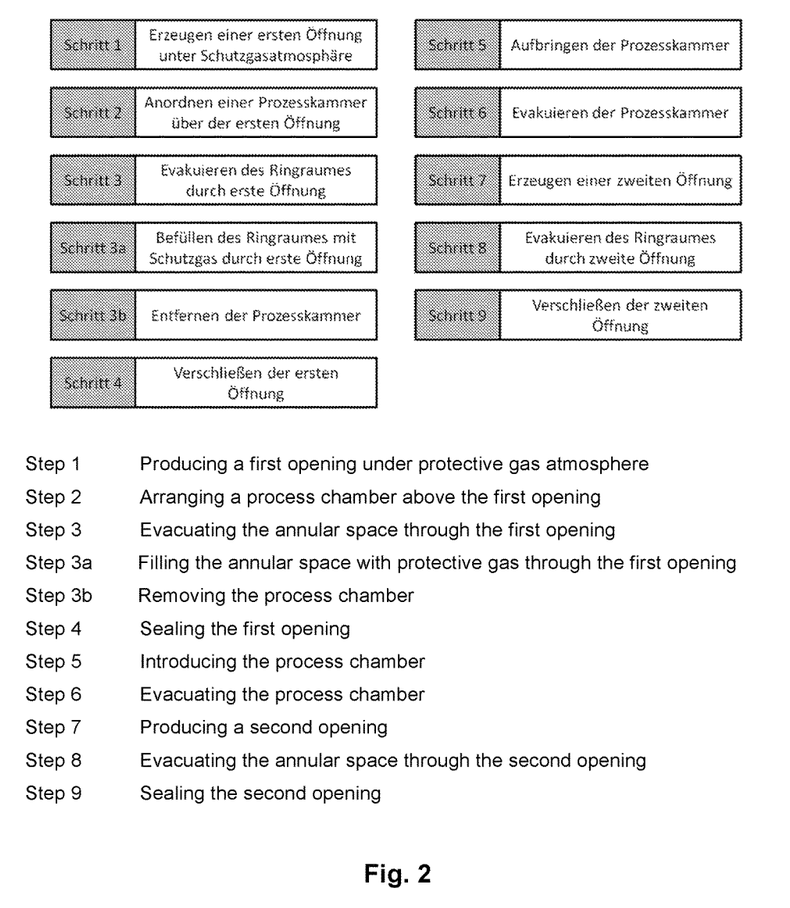
FIG. 2 shows a flow chart with the process steps of a second embodiment of the method according to the disclosure.

After terminating the evacuation/filling of the annular space with protective gas through the first opening, the process chamber is removed (see step 3b in FIG. 2, and the first opening is permanently sealed in a gas-tight manner (step 4). This can be carried out, for example, by a welding, soldering, or adhesive process. A fitted molded part is preferably used for the sealing, in order to cover the first opening and to join with the wall or the tubular jacket in a gas-tight manner.

In an advantageous embodiment of the method according to the disclosure, after sealing the first opening, a second opening that penetrates through the tubular jacket or the wall is produced (step 7 in FIG. 2); the protective gas is pumped out from the annular space through the second opening (step 8); and the second opening is sealed again (step 9). For this purpose, after sealing the first opening, preferably first the process chamber is introduced again on the wall or the tubular jacket (step 5), the process chamber is evacuated (step 6), and then the second opening is produced (step 7).

Advantageously, the second opening is smaller than the first opening. Furthermore, the second opening can be produced at the same site on the receiver tube, or also on a site other than the first opening.

In an advantageous embodiment of the method according to the disclosure, the second opening is formed by means of laser drilling methods.

The laser drilling method is particularly suitable for producing small openings. For the laser drilling, only the power and/or geometry of the laser beam need(s) to be adapted to the respective geometry and characteristics of the receiver tube, tubular jacket, and/or wall, and the necessary size of the second opening. The laser drilling method offers the possibility of producing the opening both in the tubular jacket that is predominantly composed of glass or in the wall that is predominantly composed of metal or a metal alloy, uniformly and with the same device. In contrast to machining drilling processes, a laser drilling method makes it possible to produce openings without any formation of residual material, whereby contaminants in the annular space will be avoided.

In another advantageous embodiment, the second opening is sealed by means of laser welding methods.

Sealing by means of laser welding methods offers the advantage that the opening can be sealed without additionally introducing a closure material. Furthermore, by variation of its power and/or geometry, a laser beam can be adapted to the most varied opening geometries and to different requirements, such as for example, wall thickness of the tubular jacket or of the wall, or of the material compositions thereof.

In another advantageous embodiment, the second opening is produced by means of a laser drilling method with a laser beam diameter of $d_L1$, and sealed by means of a laser welding method with a laser beam diameter of $d_L2$, wherein $d_L2$ is greater than $d_L1$.

This embodiment offers the possibility of producing the opening and sealing it again with only one laser device. In the case of sealing the opening, only the diameter of the laser beam needs to be expanded, for example, by an optical system. Subsequently, the opening is irradiated with the laser beam, the radius of which is larger than the radius of the opening. This leads to the circumstance that material lying around the opening is heated by absorption and finally melted. These molten regions subsequently flow into the opening and seal the latter.

In an advantageous embodiment of the method according to the disclosure, the sealing of both the first opening as well as the second opening can be carried out with the use of an additional closure material.

In thin-walled tubular jackets or walls it is possible that insufficient material is available for sealing of the opening by melting, so that the stability of the tubular jacket or of the wall is not assured in the region of the sealed opening. In such cases, according to the disclosure, additional material is introduced on or in the opening, whereby both the opening is sealed and the surrounding material of the tubular jacket or of the wall, respectively, is not impaired or is adversely affected only slightly.

The use of a sealing material that has a high permeability for hydrogen is also advantageous.

The use of palladium, a palladium alloy, pure iron or niobium as a closure material is particularly advantageous. When the opening is sealed thereby, a selective hydrogen window can be produced and a repeated discharging process can thus be simplified and conducted without opening the receiver tube again, since the hydrogen can escape from the annular space through the selective hydrogen window, whereas the hydrogen window is impermeable to other gases. Such hydrogen windows are already known, for example, from DE 10 2005 022 183 B3. Pure iron represents a cost-effective alternative to palladium; of course, it must be heated under protective gas.

In the following, FIGS. 3 to 7 are described, which show possible devices and device arrangements for implementing the method according to the disclosure.

Figure 3:
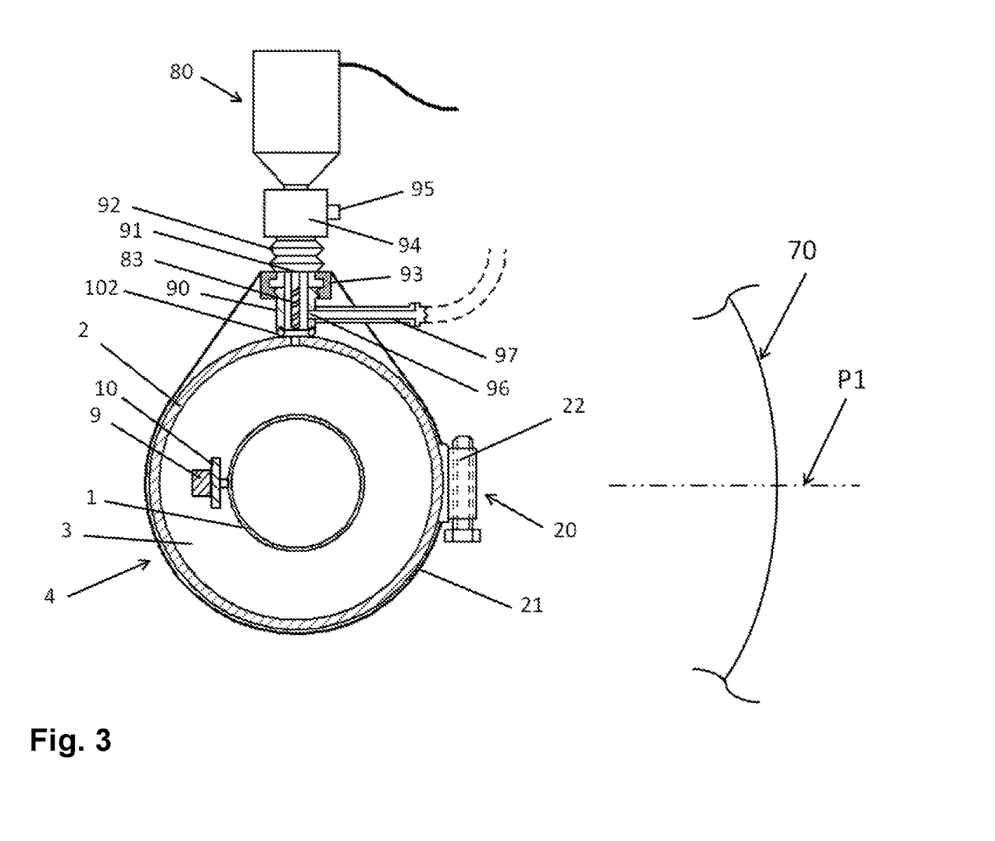
FIG. 3 shows the production of a first opening by means of mechanical drilling.
Figure 5:
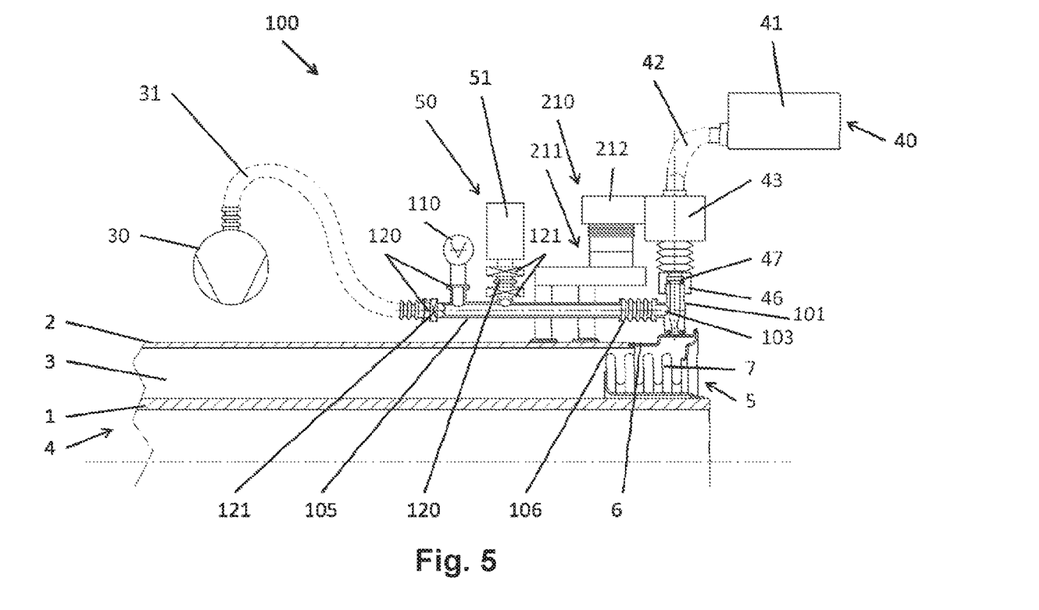
FIG. 5 shows a longitudinal section of the process chamber shown in FIG. 4.

FIG. 3 shows a receiver tube 4, which is found in the focal point of a parabolic trough 70. The receiver tube 4 has an absorber tube 1 and a tubular jacket 2, wherein an annular space 3 is formed between the absorber tube 1 and the tubular jacket 2. The outer-lying tubular jacket 2 is joined via a wall 5 to the absorber tube 1. The wall 5 contains a glass-metal transition element 6, which is illustrated in FIG. 5, as well as an expansion compensating element 7. A getter 9 is arranged on a bridge 10 in the annular space 3, said getter bridge being fastened to the absorber tube 1. Usually, the getter 9 in such an embodiment is arranged on the parabolic axis P1 intersecting the focal point and on the side of the absorber tube 1 lying opposite to the parabolic trough 70.

In addition, FIG. 3 shows a drilling machine 80, which holds a drill 83 for producing a first opening O1. The drill 83 is aligned perpendicular to the surface of the tubular jacket 2 or the wall 5, respectively, and projects into a through-opening 91 of a gas tank 90.

The gas tank 90 is joined in a gas-tight manner to an expansion bellows 92 attached to the drilling machine 80 with the help of a flange connection 93. On the side of the drilling machine, the expansion bellows 92 is connected via a connection element 94. The connection element 94 is equipped with a pressure relief valve 95. The gas tank 90 has a gas inlet opening 96, which is connected by means of a gas line 97 to a protective gas reservoir, which is not shown in the figure, for example, a nitrogen gas cylinder. The gas tank 90 is fastened in a gas-tight manner to a peripheral part of the wall 5 in the region of the glass-metal transition element 6 or to tubular jacket 2 by means of a fastening system 20.

The fastening system 20 is composed of a clamp 21 and a closure 22 and is thus arranged on the gas tank 90. When clamp 21 is tightened, a homogeneous contact pressure is produced. In order to be able to introduce the gas tank 90 rapidly and detachably onto different receiver tubes 4 with different diameters of the tubular jacket 2 or of the wall 5, respectively, the circumferential size of the clamp 21 can be variably adjusted by means of the closure 22. As an alternative to a clamp 21, a rubber band, a tension strap or a belt can be used to fix the gas tank 90 in place on the receiver tube 4.

In order to produce a gas-tight connection between gas tank 90 and receiver tube 4, a seal is introduced on the corresponding contact surface of the gas tank. In this exemplary embodiment, the seal is designed in the form of a seal ring 102. When the clamp 21 is tightened, the seal ring 102 and the gas tank 90 are pressed on the receiver tube 4 in such a way that a gas-tight connection is formed.

Figure 4:
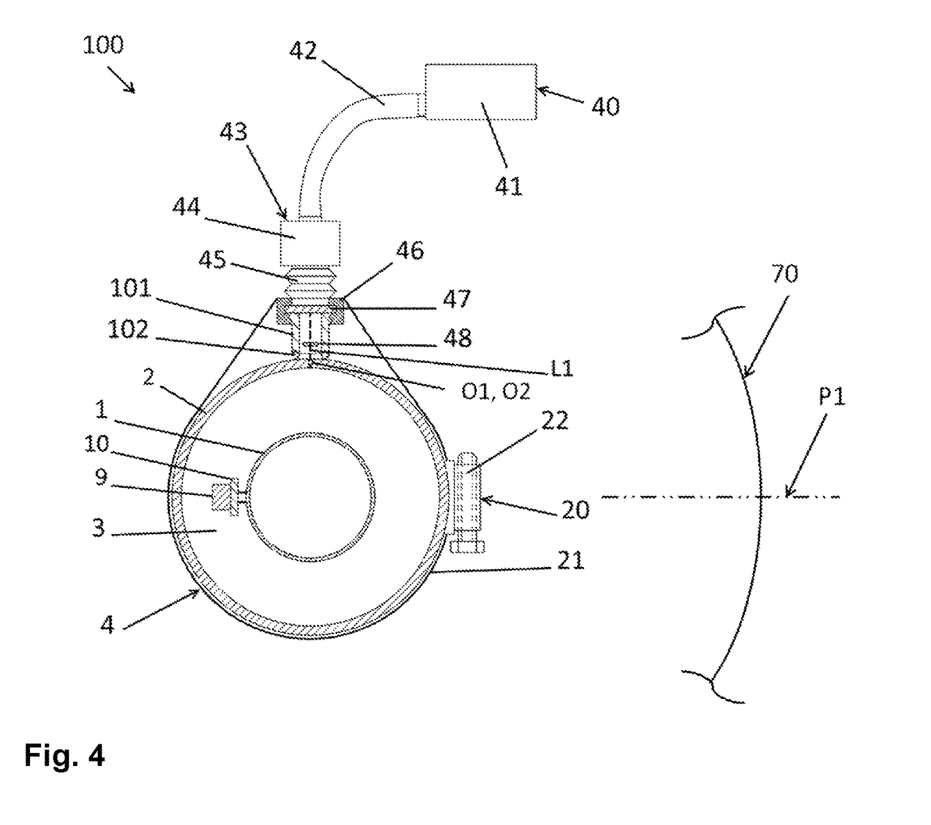
FIG. 4 shows a cross section of a process chamber for producing/sealing a second opening.

A process chamber 101 is shown in FIGS. 4 and 5. The process chamber 101 is fastened to the wall 5, respectively, or to the tubular jacket 2 by means of the fastening system 20, which was explained above in the description to FIG. 3, wherein the process chamber 101 is arranged so that it is found above the first opening O1.

In order to produce a gas-tight connection between the process chamber 101 and the receiver tube 4, a seal is attached to the corresponding contact surface of the process chamber 101, this seal being formed as a seal ring 102 in the exemplary embodiment illustrated. When the clamp 21 is tightened, the seal ring 102' and the process chamber 101 are pressed against the receiver tube 4 in such a way that a gas-tight connection is created.

In order to be able to evacuate the process chamber 101 and the annular space 3 or to be able to fill them with protective gas, they have at least one connection 103. Via a connection system, which is designed as a connection tube 105 and is shown schematically in FIG. 5, the process chamber 101 is in fluid connection with a vacuum pump and/or a getter pump 50 for evacuating the process chamber 101 and the annular space 3, a protective gas reservoir (which is not shown) as well as a sensor 110. The vacuum pump 30 in FIG. 5 is connected to the connection tube 105 by means of a vacuum hose 31. The getter pump 50 is composed of a getter tank 51, which contains an external getter for the discharge process explained in the preceding description. Valves 121 enable the vacuum in the process chamber 101 to be maintained or to fill the latter with protective gas when the vacuum pump 30 and/or the getter pump 50 are or is decoupled from the connection tube 105. For purposes of mechanical decoupling, a flexible, vacuum-tight hose element 106 is inserted between connection tube 105 and process chamber 101. For this purpose, the connection tube 105 has connections that are indicated as flanges 120 in FIG. 5. The illustration of the connection system as a connection tube 105 is not to be understood as being limiting. Also conceivable are other design variants, which enable the process chamber 101 to be evacuated or the annular space 3 to be pumped out to a few millibars. For example, another combination of tube elements and flexible connections for mechanical decoupling of the process chamber 101 from the pumps (30, 50) and/or the sensor 110 can be used. A connection to a protective gas source (e.g., a nitrogen gas cylinder) is not shown in the two views of FIGS. 4 and 5. In the form of a connection flange, the connection can open up either directly into the process chamber 101 or indirectly into the connection tube 105.

The process chamber 101 has a through-opening 104. The through-opening 104 is equipped by means of screw connection 46 with a gas-tight laser window 47 that is transparent for a laser. A laser system is arranged above the laser window 47. The laser system 40 has a laser source 41 in the form of a laser diode or a solid-state laser, for example. This laser source 41 is connected by means of a light guide 42 to a laser head 43, an optical system 44, and a focussing unit 45. In addition, a protective glass 48 is attached in the process chamber 101, said protective glass being preferably rotatable and protecting the laser window against vapor deposition during producing and sealing the second opening O2.

The connection tube 105 is fastened to a support system 210, which absorbs the mechanically acting forces, and, together with the hose element 106, relieves the sealing of the process chamber 101 at the wall 5 or the tubular jacket 2. The support system 210 has a support base 211, to which the connection tube 105 is fastened, with a support arm 212 being arranged movably at the support base 211. The support arm is joined rigidly to the laser head 43. In this way, the laser can be brought into its position necessary for producing and sealing the opening O2 and fixed in place there.

Figure 6:
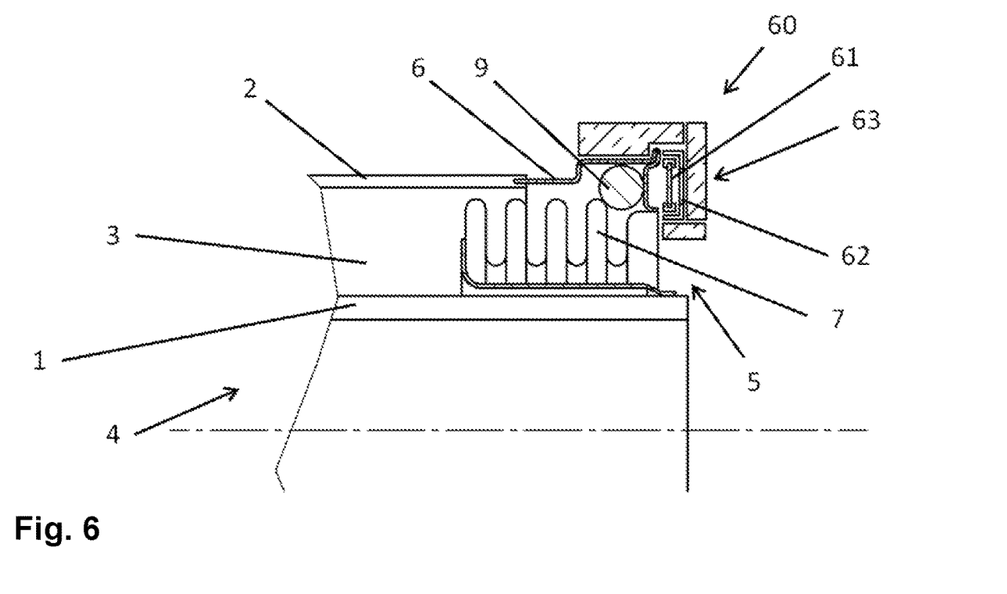
FIG. 6 shows a first variant of a heating device for discharging a getter arranged in the wall of the receiver tube and found in the annular space.
Figure 7:
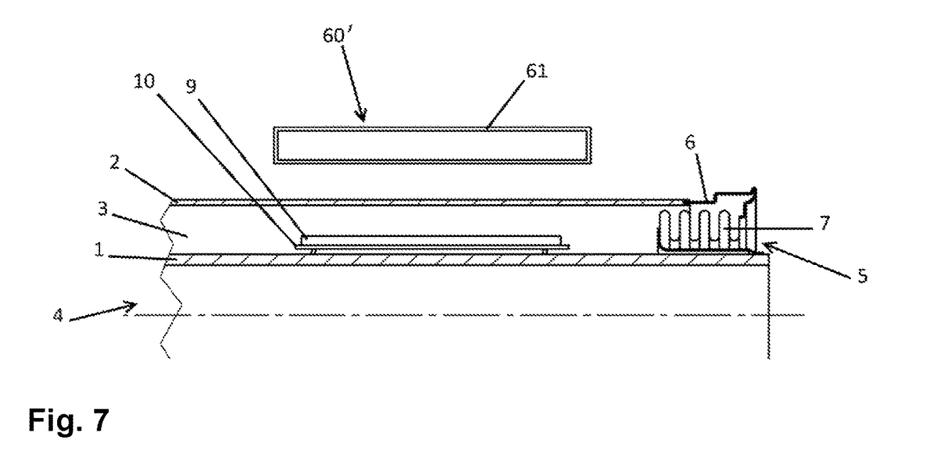
FIG. 7 shows a second variant of a heating device for discharging a getter arranged on a getter bridge at the absorber tube and found in the annular space.

Schematically illustrated in FIGS. 6 and 7 are different embodiments of a heating device 60, which vary depending on the position of a getter 9 present in the annular space 3.

If the getter 9, as shown in FIG. 6, is arranged, for example, annularly at the wall 5 of the receiver tube 4, then a contact heater on the outer side of the metal wall 5 is offered. For this purpose, a heating element 61 and a housing 62, which can also have an annular design, are mounted at the wall 5. The housing 62 and the heating element 61 as well as the section of the wall 5 surrounding the getter 9 are surrounded by an insulation 63, which reduces any heat loss.

If, on the other hand, as illustrated in FIGS. 3, 4 and 7, the getter 9 is arranged on a getter bridge 10, which is fastened on the absorber tube 1, then a radiant heater and/or induction heater are or is especially suitable. In this case, the heating device 60' is arranged outside of the receiver tube 4 and is aligned so that the radiation of energy is directed onto the getter 9 by means of suitable reflectors, for example. When the method according to the disclosure is carried out, the parabolic trough 70 is readily accessible in a maintenance position in the receiver tube 4—for example, in a "9 o'clock position" in relation to the illustrated position of the getter 9. Because the getter 9, as described above and as shown in FIG. 1a, is situated on the parabolic axis P1 of the parabolic trough 70, it is possible, in the maintenance position of the parabolic trough 70, for the heating device 60 and the process chamber 101 to be arranged at angular offset in cross section.

The different process steps of the embodiment of the method according to the disclosure for discharging the hydrogen storage system of a receiver tube 4, which is shown in FIG. 2, will be explained on the basis of FIG. 3 as well as FIGS. 4 and 5.

In the $1^{st}$ step of the method according to the disclosure for producing the first opening O1, the gas tank 90, which is connected to the drilling machine 80 via the expansion bellows 92, is arranged on the receiver tube 4 by means of fastening system 20. In this case, the seal ring 102' preferably forms the single contact between the gas tank 90 and the wall 5 or the tubular jacket 2, respectively. Subsequently, the fastening system 20 is tightened, so that the gas tank is pressed against the wall 5 or the tubular jacket 2, respectively. If the fastening system 20 is formed, for example, by a clamp 21, then tightening is produced by adjusting the closure 22. Protective gas is introduced at a slight overpressure when compared to the ambient pressure prevailing outside the receiver tube 4 into the system formed by gas tank 90, expansion bellows 92, and wall 5 or tubular jacket, via the gas line and the inlet opening. The desired pressure in the system can be adjusted by means of the pressure relief valve 95 and any pressure relief that is too high can escape outside into the environment. The first opening O1 is produced with the help of the drill 93, whereby protective gas enters into the annular space 3. By permanently supplying protective gas at a pressure in the range of ambient pressure up to preferably 0.1 bar above ambient pressure, the protective gas is introduced after sufficient waiting time to equilibrate the pressure between said protective gas atmosphere and annular space. Gas tank 90 and drilling machine 80 are removed from the receiver tube after producing the first opening O1.

In the $2^{nd}$ step of the method according to the disclosure, the process chamber 101, which is connected to the vacuum system 30, the getter pump 50, and a nitrogen inlet line, is arranged by means of fastening system 20 onto the wall 5 or the tubular jacket 2 over the first opening O1 and is fixed in place by the fastening system 20, as described in the preceding. In the transition from step 1 to step 2 of the method according to the disclosure, the protective gas found in the annular space protects the getter 9 from contact with air.

In a $3^{rd}$ process step, the receiver tube is evacuated through the first opening by means of the vacuum pump 30 and/or the getter pump 50. In this case, the free hydrogen found in the annular space and the protective gas entering during the production of the first opening O1 are pumped out. The thermal discharging of the hydrogen storage system by heating the hydrogen storage system can be started even before the evacuation of the annular space 3.

Subsequent to the evacuation of the annular space 3, this space is filled with protective gas in step 3*a* with the help of the process chamber 101, whereby the protective gas atmosphere advantageously has a slight overpressure when compared with the ambient pressure prevailing outside the receiver tube 4.

In a step 3*b*, the process chamber 101 is removed from the receiver tube 4, whereby the protective gas, which is found in the annular space 3 of the receiver tube 4, protects the getter 9 from contact with air.

In a $4^{th}$ step, the first opening O1 is preferably permanently sealed in a gas-tight manner with the use of an additional closure material with the help of a welding, soldering, or bonding process. For example, a molded part made of palladium or a palladium alloy can serve as the closure material. However, other materials such as pure iron or niobium are also conceivable.

In the $5^{th}$ step of the method according to the disclosure, prior to producing the second opening, the process chamber 101, which is arranged on the receiver tube 4, and in particular on its wall 5 or tubular jacket 2, with the vacuum system 30, the laser system 40, by means of fastening system 20, and fastened according to process step 2. In this case, the process chamber 101 need not necessarily be arranged at the site where the first opening O1 was previously found.

After the process chamber 101 was placed in a gas-tight manner on the tubular jacket 2 or the wall 5, subsequently, in the $6^{th}$ process step, the inside thereof is evacuated by means of vacuum pump 31 of the vacuum system 30 via the outlet connection 103. This evacuation takes place until pressures of approximately $10^{-3}$ to $10^{-2}$ mbar prevail in the process chamber 101.

In the $7^{th}$ step, after the process chamber 101 has been evacuated, the second opening O2 is produced through the wall 5 or the tubular jacket 2 by means of the laser system 40. For this purpose, a laser beam generated in the laser source 41 is guided over the laser head 43 and through the laser window 47 along an axis L1 into the process chamber 101 and onto the surface of the tubular jacket 2 or the wall 5, respectively.

After the wall 5 or the tubular jacket 2, respectively, has been drilled through by the laser beam, in the $8^{th}$ step, the protective gas found in the annular space 3 is pumped out through the second opening O2 by means of vacuum pumping system 30 until a defined pressure is reached in the annular space 3.

In the $9^{th}$ and last step, the second opening O2 is again sealed. For this purpose, the laser beam is expanded by the optical system 44 and the focussing unit 45 until it has a diameter at the focus point that is greater than the second opening O2 and no longer has the energy density to vaporize the material of the tubular jacket 2 or the wall 5, respectively, but rather only has the energy density to melt it. In order to seal the second opening O2, the expanded laser beam is beamed along the axis L1 onto the second opening O2. This leads to the circumstance that the edges of the second opening O2 are softened and finally melted. The molten material flows into the second opening O2 and seals it, whereby the annular space 3 and the process chamber 101 are again spatially separated from one another. Subsequently, the fastening system 20 can be detached, whereby the process chamber 101 can be completely removed from the receiver tube 4.

LIST OF REFERENCE CHARACTERS 1 absorber tube
2 tubular jacket
3 annular space
4 receiver tube
5 wall
6 glass-metal transition element
7 expansion compensating element
8 connection element
9 getter
10 getter bridge
20 fastening system
21 clamp
22 closure
30 vacuum pump
31 vacuum hose
40 laser system
41 laser source
42 light guide
43 laser head
44 optical system
45 focusing system
46 flange connection
47 laser window
48 protective glass
50 external getter pump
51 getter tank
60 heating device
61 heating element
62 housing
63 insulation
70 parabolic trough
80 drilling machine
83 drill
90 gas tank
91 through-opening
92 expansion bellows
93 flange connection
94 connection element
95 pressure relief valve
96 gas inlet opening
97 gas line
101 process chamber
102/102' seal ring
103 connection
104 through-opening
105 connection tube
106 flexible hose element
110 sensor
120 flange
121 valve
210 support system
211 support base
212 support arm
P1 parabolic axis
L1 axis
O1 first opening
O2 second opening

What is claimed is:

1. A method for discharging a hydrogen storage system, wherein the hydrogen storage system is in an annular space of a receiver tube, wherein the annular space is defined at least by an outer-lying tubular jacket and an inner-lying absorber tube of the receiver tube, and the outer-lying tubular jacket is joined by a wall to the absorber tube, wherein the method comprises the steps of:
  producing a first opening penetrating through the tubular jacket or the wall under a protective gas atmosphere, whereby a protective gas penetrates into the annular space through the first opening;
  arranging a process chamber with a connection for a vacuum pump in a gas-tight manner above the first opening;
  evacuating the receiver tube through the first opening; and
  sealing the first opening in a gas-tight manner.

2. The method according to claim 1, further comprising the step of filling the annular space with protective gas after the evacuating step and prior to the sealing step.

3. The method according to claim 2, further comprising the steps of, after the sealing step:
  producing a second opening penetrating the tubular jacket or the wall;
  pumping out the protective gas in the annular space; and
  subsequently sealing the second opening.

4. The method according to claim 3, wherein the second opening is smaller than the first opening.

5. The method according to claim 3, wherein the second opening is produced by laser drilling.

6. The method according to claim 3, wherein the second opening is sealed by laser welding.

7. The method according to claim 3, wherein the second opening is produced with laser drilling, with a laser beam diameter of $d_L 1$, and the second opening is sealed with laser welding, with a laser beam diameter of $d_L 2$, wherein $d_L 2 > d_L 1$.

8. The method according to claim 3, wherein the second opening is sealed with an additional closure material.

9. The method according to claim 2, wherein the protective gas atmosphere has a pressure $P_{SG}$, wherein $P_{SG}$ corresponds at least to ambient pressure and does not exceed an overpressure of 0.1 bar when compared to ambient pressure, during the producing and/or the filling steps.

10. The method according to claim 9, further comprising the step of, at least during the producing step and/or the filling step, introducing protective gas into the annular space of the receiver tube until pressure is equilibrated between the annular space and the protective gas atmosphere.

11. The method according to claim 2, wherein the evacuating step and the filling step are repeated cyclically.

12. The method according to claim 1, wherein the first opening is sealed with an additional closure material.

13. The method according to claim 12, wherein the closure material comprises a material with hydrogen permeability.

14. The method according to claim 13, wherein the closure material is composed of palladium, a palladium alloy, pure iron, or niobium.

15. The method according to claim 1, further comprising the step of discharging the hydrogen storage system thermally.

16. The method according to claim 15, further comprising the step of heating the receiver tube prior to the evacuating step.

17. The method according to claim 1, wherein free hydrogen enters through the first opening from the annular space into the process chamber during the evacuation, wherein the free hydrogen is bound by an external getter material, wherein the external getter material is in a tank coupled to the process chamber in a gas-tight manner.

18. The method according to claim 17, further comprising the step of discharging the external getter material after terminating the evacuation through the first opening.

19. The method according to claim 1, wherein the first opening is produced mechanically.

20. The method according to claim 1, wherein the protective gas is nitrogen, argon, or a mixture of nitrogen and argon.

* * * * *